United States Patent
Riedl et al.

(10) Patent No.: US 10,085,045 B2
(45) Date of Patent: Sep. 25, 2018

(54) DYNAMIC GENERATION OF VIDEO-ON-DEMAND ASSETS FOR MULTICHANNEL VIDEO PROGRAMMING DISTRIBUTORS

(71) Applicant: Turner Broadcasting System, Inc., Atlanta, GA (US)

(72) Inventors: Steven Ernest Riedl, Atlanta, GA (US); Donald Jude Loheide, Mableton, GA (US); Nishith Kumar Sinha, Mableton, GA (US); Mark Cooper Pope, V, Atlanta, GA (US)

(73) Assignee: Turner Broadcasting System, Inc., Atlanta, GA (US)

( * ) Notice: Subject to any disclaimer, the term of this patent is extended or adjusted under 35 U.S.C. 154(b) by 0 days.

(21) Appl. No.: 15/395,206

(22) Filed: Dec. 30, 2016

(65) Prior Publication Data

US 2018/0192079 A1 Jul. 5, 2018

(51) Int. Cl.

| | |
|---|---|
| *H04N 21/20* | (2011.01) |
| *H04N 21/231* | (2011.01) |
| *H04N 21/2343* | (2011.01) |
| *H04N 21/2347* | (2011.01) |
| *H04N 21/235* | (2011.01) |
| *H04N 21/2187* | (2011.01) |
| *H04N 21/262* | (2011.01) |
| *H04N 21/254* | (2011.01) |
| *H04N 21/81* | (2011.01) |

(Continued)

(52) U.S. Cl.
CPC ..... *H04N 21/2187* (2013.01); *H04N 21/2541* (2013.01); *H04N 21/262* (2013.01); *H04N 21/4884* (2013.01); *H04N 21/812* (2013.01); *H04N 21/8358* (2013.01)

(58) Field of Classification Search
CPC ............. H04N 21/20; H04N 21/23109; H04N 21/234309; H04N 21/23439; H04N 21/2347; H04N 21/2358
USPC .................................. 725/87, 93, 115, 116
See application file for complete search history.

(56) References Cited

U.S. PATENT DOCUMENTS

| | | | |
|---|---|---|---|
| 5,600,573 A * | 2/1997 | Hendricks | H04H 20/42 348/E5.002 |
| 6,434,621 B1 | 8/2002 | Pezzillo et al. | |

(Continued)

OTHER PUBLICATIONS

Office Action in U.S. Appl. No. 15/395,296 dated Jan. 11, 2018.

(Continued)

*Primary Examiner* — Dominic D Saltarelli
(74) *Attorney, Agent, or Firm* — Chip Law Group

(57) ABSTRACT

A live content distribution device that dynamically generates video-on-demand (VOD) assets for multichannel video programming distributors (MVPDs), receives a live video feed, a plurality of triggers, and metadata from a broadcast provider system over a communication network. The live content distribution device is provided in a MVPD system. A plurality of segments are determined in the received live video feed based on the received plurality of triggers and metadata. One or more VOD content assets are dynamically generated based on a package for playout to one or more servers communicatively coupled with the MVPD system. The package includes one or more of the determined plurality of segments and metadata associated with the determined plurality of segments.

24 Claims, 7 Drawing Sheets

(51) Int. Cl.
*H04N 21/488* (2011.01)
*H04N 21/8358* (2011.01)

(56) References Cited

U.S. PATENT DOCUMENTS

| | | | |
|---|---|---|---|
| 2002/0087976 A1* | 7/2002 | Kaplan | H04N 7/17336 |
| | | | 725/34 |
| 2003/0034996 A1* | 2/2003 | Li | G06F 17/30787 |
| | | | 715/719 |
| 2004/0117429 A1 | 6/2004 | Karaoguz et al. | |
| 2008/0101456 A1 | 5/2008 | Ridge et al. | |
| 2011/0022471 A1 | 1/2011 | Brueck et al. | |
| 2016/0249094 A1* | 8/2016 | Agro | H04N 21/4126 |
| 2017/0064400 A1 | 3/2017 | Riegel et al. | |

OTHER PUBLICATIONS

Advisory Action in U.S. Appl. No. 15/395,296 dated Apr. 6, 2018.
Non-Final Office Action in U.S. Appl. No. 15/395,296 dated Jul. 13, 2018.

* cited by examiner

DYNAMIC GENERATION OF VIDEO-ON-DEMAND ASSETS FOR MULTICHANNEL VIDEO PROGRAMMING DISTRIBUTORS

CROSS-REFERENCE TO RELATED APPLICATIONS/INCORPORATION BY REFERENCE

This Application makes reference to:
U.S. application Ser. No. 15/395,296, which is filed concurrently herewith.

The above referenced application is hereby incorporated herein by reference in its entirety.

FIELD OF TECHNOLOGY

Certain embodiments of the disclosure relate to a television broadcast system. More specifically, certain embodiments of the disclosure relate to a method and system for dynamic generation of video-on-demand assets for multichannel video programming distributors.

BACKGROUND

The past decade has witnessed a massive expansion of live web simulcast services in the field of advertisement-based broadcasting and cable networking systems. One of various examples of such live web simulcast services is providing video-on-demand (VOD) content by a content provider system to a multichannel video program distributor (MVPD) when demanded by a viewer via a traditional cable set-top box with limited bandwidth and resources. For such content delivery, the content provider system encodes the VOD content at a specific bitrate, such as mezzanine bitrate, and decides a specific format, such as "C3" VOD, according to a programming schedule.

In certain scenarios, the content provider system may be required to re-encode the VOD content at appropriate high definition (HD) or standard definition (SD) formats. Further, files, for example, asset distribution interface (ADI) metadata that accompanies the VOD content, may be required to be reprocessed by a third party to redistribute the VOD content as a high priority pitch to the MVPDs. Such re-encoding and pitching process may increase the overall cost and time to get the VOD content live on the MVPDs' VOD systems. This time period corresponds to a duration when a large portion of the C3 viewing (refers to delayed viewing of live content by a certain duration, such as 75 Hours for example) takes place and thus, results in costing the content provider rating points and therefore a loss in revenue generated from advertisements. Thus, there is a need for a dynamic VOD content assets generating system that can reduce the cost and speed up the delivery of the VOD content from the content provider to the MVPDs associated with traditional VOD distribution systems while maintaining appropriate content rights.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for dynamic generation of video-on-demand assets for multichannel video programming distributors, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1A:
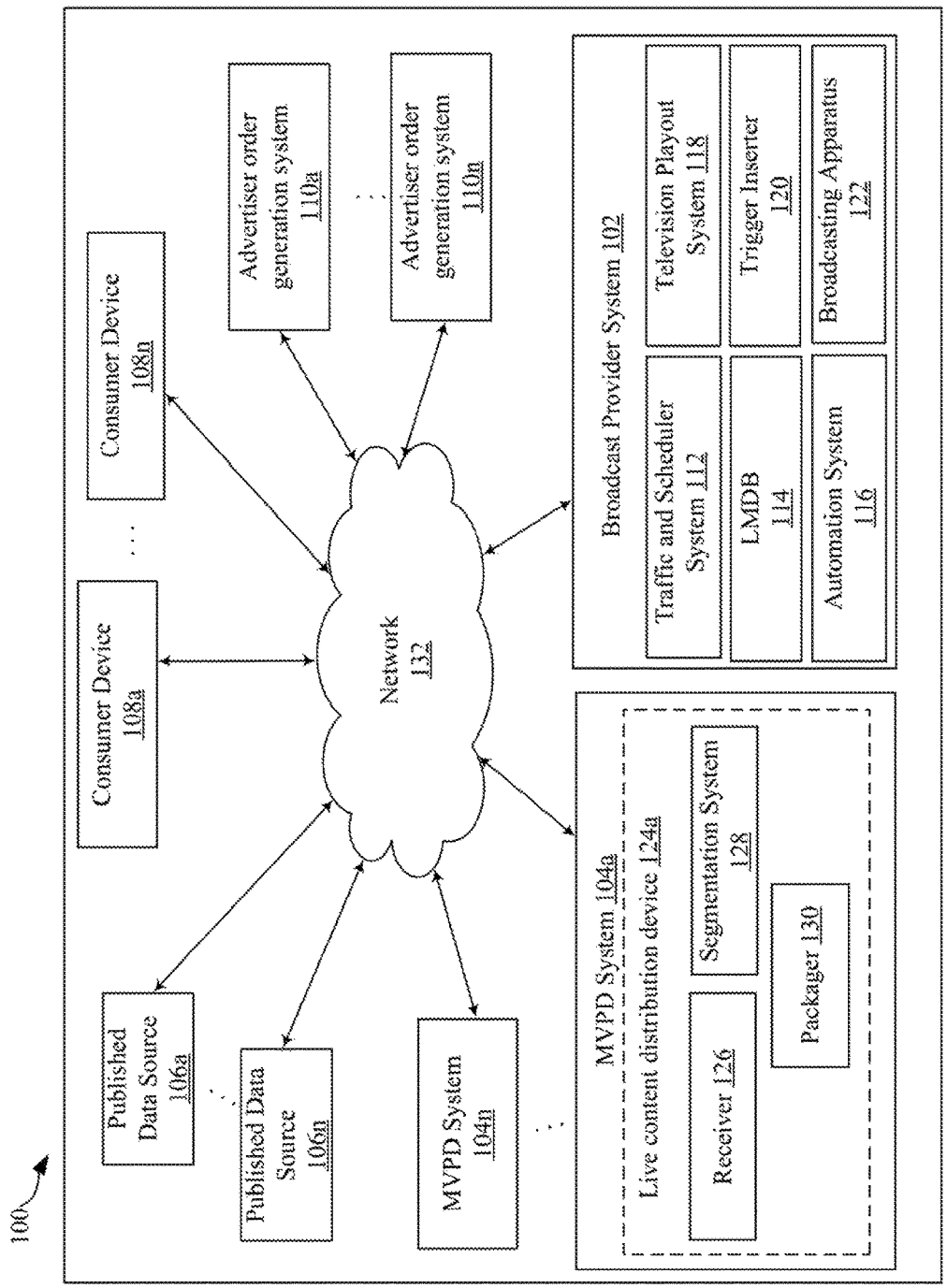
FIG. 1A is a block diagram that illustrates an exemplary system for dynamic generation of video-on-demand (VOD) assets for multichannel video programming distributors (MVPDs), in accordance with an exemplary embodiment of the disclosure.

Certain embodiments of the disclosure may be found in a method and system for dynamic generation of VOD assets for MVPDs. Various embodiments of the disclosure provide a method and system that generates a new channel comprising one or more VOD content assets, based on one or more scheduling rules of the playout schedule. In accordance with various embodiments of the disclosure, a live content distribution device provided in a MVPD system, receives a live video feed, a plurality of triggers, and metadata from a broadcast provider system over a communication network. The live content distribution device may be provided in a MVPD headend of the MVPD system. A plurality of segments in the received live video feed is determined based on the received plurality of triggers and metadata. The live video feed may be a broadcast feed received from the broadcast provider system. The received live video feed may be encoded at the broadcast provider system associated with a content provider, and may include graphical content, closed captions, and specified watermarks.

One or more VOD content assets are dynamically generated based on a package for playout to one or more servers communicatively coupled with the MVPD system. The package includes one or more of the determined plurality of segments and metadata associated with the determined one or more of the plurality of segments. The one or more servers may be communicatively coupled with the MVPD system and may correspond to one or more legacy VOD servers.

The received metadata may be generated by the broadcast provider system based on first information received from a traffic and scheduler system, and second information received from an automation system. The first information received from the traffic and scheduler system is associated with a playout schedule or a specific playout schedule. The second information received from the automation system is associated with an updated playout schedule or an updated specific playout schedule. The metadata may include at least digital rights associated with the live video feed, timing information associated with one or more commercial breaks, a playout schedule to play the one or more advertisements within one or more segments of programming data of the live video feed, and signaling content of the live video feed. The metadata may be determined and updated in real-time by the broadcast provider system associated with a content provider based on information related to at least a playout schedule of programming data and advertisement and promotional content, an updated playout schedule of the programming data and advertisement and promotional content, and titles associated with the programming data. In accordance with an embodiment, the metadata may be received in-band with the live video feed and the plurality of triggers. In accordance with an embodiment, the metadata may be received out-of-band separate from the live video feed and the plurality of triggers. In accordance with an embodiment, the plurality of segments may be transcoded and embedded with one or more audio markers.

FIG. 1A is a block diagram that illustrates an exemplary system for dynamic generation of VOD assets for MVPDs, in accordance with an exemplary embodiment of the disclosure. Referring to FIG. 1A, the system 100, comprises a broadcast provider system 102, a plurality of MVPD systems 104a, . . . , 104n, a plurality of published data sources 106a, . . . , 106n, a plurality of consumer devices 108a, . . . , 108n, and a plurality of advertiser order generation systems 110a, . . . , 110n. The broadcast provider system 102 may include a traffic and scheduler system 112, a live metadata database (LMDB) 114, an automation system 116, a television playout system 118, a trigger inserter 120, and a broadcasting apparatus 122. Each of the plurality of MVPD systems 104a, . . . , 104n may include a live content distribution device of the plurality of live content distribution devices 124a, . . . , 124n. Each live content distribution device of the plurality of live content distribution devices 124a, . . . , 124n, such as the live content distribution devices 124a, may include a receiver 126, a segmentation system 128, and a packager 130. There is further shown a network 132 through which the broadcast provider system 102, the plurality of MVPD systems 104a, . . . , 104n, the plurality of published data sources 106a, . . . , 106n, the plurality of consumer devices 108a, . . . , 108n, and the plurality of advertiser order generation systems 110a, . . . , 110n are communicatively coupled with each other.

The broadcast provider system 102 may comprise suitable logic, circuitry, and interfaces that may be configured to execute code that communicate a linear video feed (also referred to as a network television feed or broadcast feed) and corresponding playout schedule to the plurality of MVPD systems 104a, . . . , 104n. In a broadcast chain, the broadcast provider system 102 may receive actual content, for example, from a production studio, in a serial digital interface (SDI) video interface and/or on a high-definition SDI (HD-SDI) video interface, process the content, such as insertion of graphics, closed captions, preparation of programming schedule, insertion of triggers, and the like, and final delivery by the broadcasting apparatus 122. The communicated linear video feed and the playout schedule may correspond to a channel, such as CNN channel that is broadcast to the plurality of MVPD systems 104a, . . . , 104n, via a communication network, such as the network 132. The linear video feed may be broadcasted as a multi-program transport stream (MPTS) (also referred to as a live video feed) to the plurality of MVPD systems 104a, . . . , 104n, via the network 132. The broadcast provider system 102 may be owned by (or associated to) a broadcast provider or operator, a network provider or operator, or a content provider or operator.

Each of the plurality of MVPD systems 104a, . . . , 104n may comprise suitable logic, circuitry, and interfaces that may be configured to provide video programming services to viewers, usually for a subscription fee (such as pay television). Each of the plurality of MVPD systems 104a, . . . , 104n may comprise a headend where the MVPD system assembles and prepares its multiple channels of video programming for distribution to the viewers. Each of the plurality of MVPD systems 104a, . . . , 104n may receive the MPTS, which includes the signaling content and metadata, from the broadcast provider system 102 based on current society of cable telecommunication engineers (SCTE) standards (SCTE-35 and SCTE-224) to control web and regional blackouts, network end of day switching, and advertisement insertion. For example, the plurality of MVPD systems 104a, . . . , 104n may be signaled for various blackout types with in-band SCTE-35 message. Further, the plurality of MVPD systems 104a, . . . , 104n may receive program metadata that specifies certain events or operations, such as, for example, when to blackout shows, recording programs off the live video feed for startover or Cx (x is an integer representing the number of day since original airing) (VOD) packaging, with SCTE-224 message. Examples of the plurality of MVPD systems 104a, . . . , 104n may include direct-broadcast satellite (DBS) providers, cable television (CATV) systems, and other wireline video providers and competitive local exchange carriers (CLECs) using IPTV.

Each of the plurality of published data sources 106a, . . . , 106n may comprise suitable logic, circuitry, and interfaces that may be configured to execute code that provides actual viewership or rating for programs that were aired. As illustrated in FIG. 1A, the plurality of published data sources 106a, . . . , 106n are coupled to the broadcast provider system 102 via the network 132. An exemplary published data source may be Nielsen. Nielsen has the capability to determine when a viewer watches the same set of media items, i.e. advertisements and/or promotional content, in programming data, such as an episode, in a live video feed within 3 days of original airing, and provide Nielsen "C3" credit. In accordance with an embodiment, based on the Nielsen "C3" credit, the broadcast provider system 102 may be configured to generate a new channel, "D4 channel", which may be broadcasted on day "4" of the originally aired live video feed. Another exemplary published data source may be a published database that provides ratings for media items, such as GRP. The GRP is an advertising impact measure or a promotion impact measure for each advertising and/or promotional campaigns, known in the art.

The consumer devices 108a, . . . , 108n may refer to end-user devices where the one or more VOD assets are rendered to be viewed by a viewer. The number of impressions of a media item, such as an advertisement and/or promotional content, on such plurality of consumer devices 108a, . . . , 108n determines the advertising impact or promotion impact and number of actual viewership achieved during campaigns. Examples of the consumer devices 108a, . . . , 108n may include, but are not limited to, connected TVs, connected TV with paired devices (e.g., tablets), and second screen devices such as smartphones and tablets.

Each of the plurality of advertiser order generation systems 110a, . . . , 110n may comprise suitable logic, circuitry, and interfaces that may be configured to place orders with the broadcast provider system 102 that may include information about type of spots to be broadcast, the number of spots to be broadcast, and when the spots should be aired. The broadcast provider system 102 may be configured to electronically receive, via a communication network, deals comprising advertisers' orders from the plurality of advertiser order generation systems 110a, . . . , 110n. The traffic and scheduler system 112 may be configured to receive an advertiser's order to place one or more spots into one or more commercial breaks. The advertiser order generation systems 110a, . . . , 110n may provide multiple orders, which need not be submitted at the same time. Therefore, the traffic and scheduler system 112 may continuously receive orders with new or additional spots to be placed and may need to update any previously determined commercial break schedule to accommodate the constraints and requirements of those spots already placed and of the new spots being received. In this regard, the advertiser order generation systems 110a, . . . , 110n may electronically book spots to a selling title, and within the selling title there are constraints. The advertiser's order comprises airing constraints and placement requirements corresponding to the one or more spots.

The traffic and scheduler system 112 may comprise suitable logic, circuitry, and interfaces that may be configured to execute code that receives an advertiser's orders to place one or more spots into one or more commercial breaks. The received orders are queued and placements of a plurality of advertisements in the incoming linear video feed are determined. The plurality of advertisements are placed into one or more commercial breaks (also referred to as advertisement space) appearing in a same selling title or different selling titles of the linear video feed. A selling title is an interval of programming time that the broadcast provider system 102 utilizes to sell commercial airtime. In some cases, the term daypart may be utilized as an alternative name for a selling title, but in other cases a daypart may be an aggregation of selling titles. In accordance with an embodiment, the traffic and scheduler system 112 may be configured to determine a playout schedule based on the placement of the plurality of advertisements into the commercial breaks in the incoming linear video feed. In accordance with an embodiment, the traffic and scheduler system 112 may receive the playout schedule and/or a specific playout schedule from the source device 133. In accordance with an embodiment, the traffic and scheduler system 112 may be implemented as distinct entities, for example as a traffic system and a scheduler, as described in FIG. 1B.

The LMDB 114 may comprise suitable logic, circuitry, and interfaces that may be configured to store metadata related to the programming data in the linear video feed provided by one or more components of the broadcast provider system 102, such as the traffic and scheduler system 112 and the automation system 116. The LMDB 114 may be configured to receive metadata from the traffic and scheduler system 112 and the television playout system 118. The LMDB 114 may be configured to distribute such program metadata to the plurality of MVPD systems 104a, . . . , 104n or external affiliates for individual networks via SCTE-224 (originally DVS1179) message. The SCTE-224 specification defines encryption, timings and basic program information to distribute, and other information to look for in the broadcast live video feed to indicate program starts and stops. The LMDB 114 may be further configured to update the metadata in real-time based on information related to at least a playout schedule of programming data, advertisement and promotional content, an updated playout schedule, and titles associated with the programming data.

The automation system 116 may comprise suitable logic, circuitry, and interfaces that may be configured to execute code that coordinates the television playout system 118 with the trigger inserter 120 based on the playout schedule received from the traffic and scheduler system 112. The automation system 116 may coordinate the television playout system 118 with the trigger inserter 120 for insertion of a plurality of triggers in an uncompressed SDI video of a channel before broadcast. In accordance with an embodiment, the automation system 116 may be configured to generate a new channel based on one or more scheduling rules of the specific playout schedule, to be transmitted to the plurality of MVPD systems 104a, . . . , 104n at a time specified in the received specific playout schedule. In one embodiment, the time may be specified by metadata. In another embodiment, the time may be specified inband with the content.

The television playout system 118 may comprise suitable logic, circuitry, and interfaces that may be configured to execute code that handles a playout of a channel (such as a television channel). In this regards, the television playout system 118 may adjust a plurality of splice points that demarcates different media items, such as a transition point from a TV program to an advertisement or a promotional media, in a linear video feed (uncompressed SDI video) of the channel to maintain the playout schedule. The television playout system 118 may be operated by the broadcast provider system 102 for managing a single channel or a plurality of channels. In accordance with an embodiment, the television playout system 118 may be configured to store and deliver playout of the linear video feed with broadcast chain elements, for example, such as graphics, closed captions, Nielson markers, format definition data, vertical interval time codes (VITC), and the like.

The trigger inserter 120 may comprise suitable logic, circuitry, and interfaces that may be configured to execute code that handles insertion of SCTE 104/35, a plurality of cues or triggers in the linear video feed. In this regard, the trigger inserter 120 may be configured to insert the plurality of cues or triggers as per SCTE-104-based digital ad-marker or society of motion picture and television engineers (SMPTE) 2010 standards in coordination with the automation system 116. Various examples of such plurality of cues or triggers may be splice points, such as program start, program end, content placement opportunity start/end, commercial break start, commercial break end, promotional content start, promotional content end, advertisement start/end, and the like.

The broadcasting apparatus 122 may be a device which broadcasts an electromagnetic signal corresponding to one or more television channels to the plurality of MVPD systems 104a, ..., 104n. The broadcasting apparatus 122 may be analog or digital. In an example, the broadcasting apparatus 122 transmits channels that are unencrypted and therefore free-to-air or free-to-view. In another example, the broadcasting apparatus 122 transmits channels with encryption (pay television), and thus requiring a subscription by the plurality of consumer devices 108a, ..., 108n via the plurality of MVPD systems 104a, ..., 104n. In such a case, the encryption may be based on conditional access (CA) or digital rights management (DRM) technology, known in the art. The broadcasting apparatus 122 may act as a source device or a source of receipt of the broadcast feed of one or more channels for the plurality of MVPD systems 104a, ..., 104n.

Each of the plurality of live content distribution devices 124a, ..., 124n in the corresponding MVPD system of the plurality of MVPD systems 104a, ..., 104n may comprise suitable logic, circuitry, and interfaces that may be configured to execute code to dynamically generate VOD content assets. Consequently, the plurality of live content distribution devices 124a, ..., 124n may be referred to as a live catcher as it allows capture (a recording) of a live video feed (a broadcast feed received from the broadcasting apparatus 122 of the broadcast provider system 102), which is used to create VOD content assets at the plurality of MVPD systems 104a, ..., 104n.

Figure 1B:
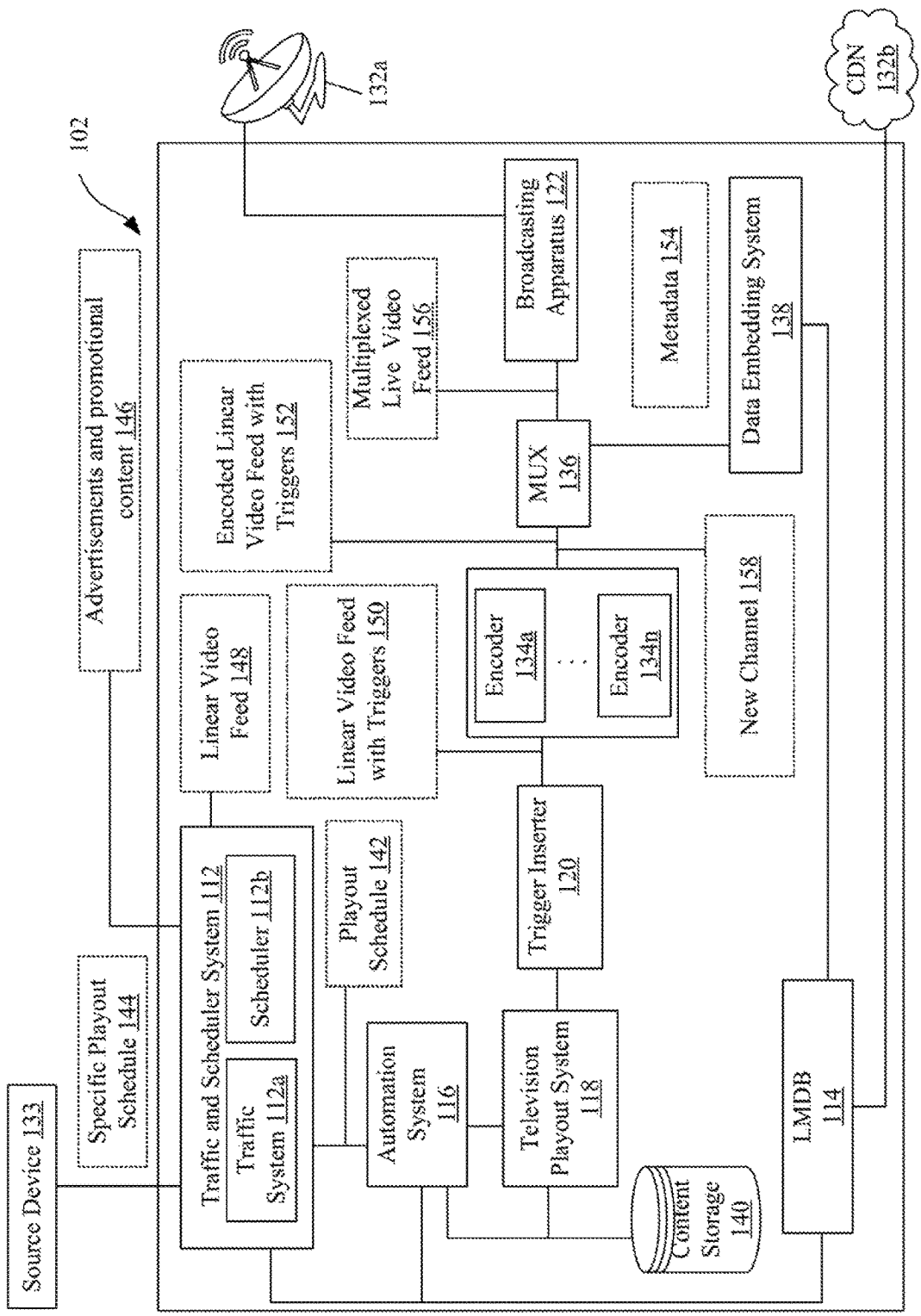
FIG. 1B is a block diagram that illustrates an exemplary broadcast provider system for broadcasting encoded video feed of a channel to a plurality of MVPDs and generating a new channel comprising one or more VOD content assets, in accordance with an exemplary embodiment of the disclosure.

The receiver 126 may comprise suitable logic, circuitry, and interfaces that may be configured to execute code that receives the live video feed from the broadcast provider system 102, via the network 132 (such as a satellite communication network 132a as shown in FIG. 1B), encrypted based on the CA and/or DRM technology.

The segmentation system 128 may comprise suitable logic, circuitry, and interfaces that may be configured to execute code to determine a plurality of segments (or chunks) in the received live video feed based on the received plurality of triggers and metadata. The segmentation system 128 may be further configured to store the plurality of segments (or chunks) at a storage space provided in the corresponding live content distribution device.

The packager 130 may comprise suitable logic, circuitry, and interfaces that may be configured to execute code to determine a package that includes content and associated metadata. The content may correspond to one or more of the plurality of segments transcoded to different types of streams for different types of devices, such as a TV or a mobile device, and marked with Nielson markers. Based on such a package, a corresponding live content distribution device may dynamically generate one or more VOD content assets for playout to one or more servers communicatively coupled with the corresponding MVPD system. The packager 130 may be directly or indirectly coupled to a local storage (not shown).

The packager 130 may be configured to publish the one or more VOD content assets in real-time or near real-time. The packager 130 may be operable to create "C3" content assets and clips that may be made available before content roles out of the MVPD system 104a. The packager 130 may also be configured to provide near-real time redundancy. The resulting converted output, i.e. one or more VOD content assets, that is generated by the packager 130 may be communicated to the legacy VOD server which may be communicatively coupled with the plurality of consumer devices 108a, ..., 108n. The packager 130 may also support a robust interface (e.g. ADI) that defines the on-demand duration of the individual segments as well as encryption requirements and a service type to link for ad insertion.

The network 132 may be any kind of network, or a combination of various networks, and it is shown illustrating the communication that may occur between the broadcast provider system 102, the plurality of published data sources 106a, ..., 106n, the plurality of MVPD systems 104a, ..., 104n, the plurality of consumer devices 108a, ..., 108n, and the plurality of advertiser order generation systems 110a, ..., 110n. For example, the network 132 may comprise one or more of a cable television network, the Internet, a satellite communication network 132a, a CDN network 132b, a wide area network (WAN), a medium area network (MAN), and a local area network (LAN).

In operation, the live content distribution device 124a provided in the MVPD system 104a may be configured to receive a live video feed, a plurality of triggers, and metadata from a broadcast source, such as the broadcasting apparatus 122 of the broadcast provider system 102, over a communication network, such as the network 132. The receiver 126 in the live content distribution devices 124a may receive the live video feed from the broadcast provider system 102, via the network 132. Similarly, the plurality of live content distribution devices 124a, ..., 124n in the plurality of MVPD systems 104a, ..., 104n may be configured to receive the live video feed and the plurality of triggers as SCTE-35 message from the broadcast provider system 102, over the network 132. For brevity, the functionality of only one live content distribution device, such as the live content distribution device 124a is explained hereinafter. Notwithstanding, the functionality of the remaining ones of the plurality of live content distribution devices 124b, ..., 124n is similar to the functionality of the live content distribution devices 124a, without any deviation from the scope of the disclosure.

In accordance with an embodiment, a transcoder associated with the receiver 126 may transcode the format of the received live video feed into another format compatible with the MVPD system 104a. The receiver 126 may communicate such live video stream to the segmentation system 128. The segmentation system 128 may determine a plurality of segments (or chunks) in the received live video feed based on the received plurality of triggers and metadata. The segmentation system 128 may be further configured to store the plurality of segments (or chunks) at a storage space provided in the live content distribution device 124a. In accordance with various embodiments, the plurality of segments and the associated metadata may be stored in the storage space in accordance with various versions, such as "C3", "C7", or "Cx", as specified in the playout schedule.

In accordance with an embodiment, one or more of the plurality of segments may be directly provided from the storage space to one or more active video servers. The one or more active video servers may playout the received content to one or more of the plurality of consumer devices 108a, ..., 108n. In accordance with another embodiment, the plurality of segments may be further transcoded into another format, for example, MPEG2 TS, and after applying Nielsen markers, the resulting transport stream may be provided to the packager 130. The packager 130 may generate an ADI package that includes content and associated metadata. The content may correspond to one or more of the plurality of segments transcoded to MPEG2 TS and marked with Nielsen markers. The metadata may be standardized by various known standards, such as CableLabs®. Based on such an ADI package, the live content distribution device 124a may dynamically generate one or more VOD content assets for playout to one or more servers, i.e. one or more legacy VOD servers, communicatively coupled with the corresponding MVPD system 104a. The one or more legacy VOD servers may further playout the received content to one or more of the plurality of consumer devices 108a, . . . , 108n. An example of the generation of the one or more VOD content assets is shown and described, in FIGS. 1C, 1D, 2, and 3.

In accordance with an exemplary aspect of the disclosure, the traffic and scheduler system 112 may be configured to define a playout schedule of a channel. The playout schedule of a channel defines media content that should be scheduled, the ordering of the media content during playout, and when to deliver content. The content that is delivered may include both the programming content, such as TV programs, and the non-programming content, such as advertisements or promotional media. In accordance with an embodiment, the playout schedule may be a text file or an XML file, that comprise a reference mapping of different media content items. The playout schedule may correspond to the linear video feed of the channel to be broadcasted to the plurality of MVPD systems 104a, . . . , 104n. The automation system 116 may receive the playout schedule of the channel from the traffic and scheduler system 112 and further query the content storage 140 to provide required programming data and the plurality of advertisements and/or a promotional media based on the playout schedule. The automation system 116 may provide the programming data and the plurality of advertisements and/or a promotional content that are included in the linear video feed to the television playout system 118 to prepare a playout of a channel (such as a television channel). The television playout system 118 may adjust a plurality of spots in the linear video feed of the channel to maintain the playout schedule. Further, the television playout system 118 may deliver a playout of the linear video feed to broadcast chain elements, such as graphics, closed captions, Nielson markers, format definition data, vertical interval time codes (VITC) and the like.

The trigger inserter 120 may further insert the plurality of SCTE 104 cues or triggers in the linear video feed. Thereafter, such linear video feed with inserted plurality of triggers may be encoded by varying bitrates and the SCTE-104-based digital content-marker is converted to SCTE-35-based digital content-marker. In accordance with an embodiment, the encoded linear video feed may be multiplexed with SCTE-224 message from LMDB 114 and broadcasted (or stored), via the network 132, such as the satellite communication network 132a, to the plurality of MVPD systems 104a, . . . , 104n for subsequent playout. In such a case, the SCTE-224 message may be embedded in the encoded video feed by a data embedding system (shown in FIG. 1B) during the multiplexing. In accordance with another embodiment, the metadata may be communicated out-of-band separate from the linear video feed and the plurality of triggers and communicated, via the network 132, such as CDN network 132b (shown in FIG. 1B) to the plurality of MVPD systems 104a, . . . , 104n. In such a case, the LMDB 114 separately communicates SCTE-224 (originally DVS1179) message as out-of-band metadata to the plurality of MVPD systems 104a, . . . , 104n via the CDN network 132b.

In accordance with another aspect of the disclosure, the traffic and scheduler system 112 may be configured to receive a specific playout schedule, which corresponds to the linear video feed of the channel broadcasted to the plurality of MVPD systems 104a, . . . , 104n, from a specific source device, such as D4 schedule source. In such a case, the broadcast provider system 102 may generate the new channel comprising one or more VOD content assets, based on the one or more scheduling rules of the specific playout schedule, to be transmitted to the plurality of MVPD systems 104a, . . . , 104n at the time specified in the received specific playout schedule. For example, the new channel, such as "D4 Channel" may be generated for day "4" of the broadcasted linear video feed of the channel in accordance when the version of the previously delivered VOD content assets is "C3."

The specific playout schedule may include one or more scheduling rules that correspond to the linear video feed of a channel broadcasted to the plurality of MVPD systems 104a, . . . , 104n. A first scheduling rule may correspond to sanitization of the received linear video feed of the channel by removal of a lower third graphical content overlay from the linear video feed for the generation of the new channel. A second scheduling rule may correspond to insertion of a discontinuity between program segments to allow DAI within the program segments of the linear video feed for the new channel. In an example, the discontinuity may be a gap between a TV program and various interstitial content items, such as advertisements. In another example, the discontinuity may be a fade-to-black change or insertion of one or more frames of an intermediate brightness level. In yet another example, the discontinuity may be a transition between standard dynamic range (SDR)-HLG or HLG-PQ or HLG- to Prime, and so on.

A third scheduling rule may correspond to insertion of a unique source identifier/time in content in the linear video feed for the new channel. A fourth scheduling rule may correspond to insertion of new promotional content items, specific to the broadcast provider system 102 of the linear video feed, along with VOD content assets for the new channel. The specific playout schedule may further include a time at which the new channel may be generated and broadcasted to the plurality of MVPD systems 104a, . . . , 104n.

The traffic and scheduler system 112 may be further configured to receive cleared and/or modified advertisement orders, queue them, and determine placements of a plurality of advertisements in the linear video feed. The traffic and scheduler system 112 may transmit the playout schedule of the channel to the automation system 116. The automation system 116 may further query the content storage to provide required the programming data and the plurality of advertisements and/or promotional content based on the specific playout schedule.

The automation system 116, in conjunction with one or more components, may sanitize the received linear video feed of the channel by removal of a lower third graphical content overlay from the linear video feed for the generation of the new channel. Further, the automation system 116, in conjunction with one or more components, may insert a discontinuity between program segments to allow DAI within the program segments of the linear video feed for the new channel. Further, the automation system 116, in conjunction with one or more components, may insert a unique source identifier/time in content in the linear video feed for the new channel. Further, the automation system 116, in conjunction with one or more components, may insert new promotional content items, specific to the broadcast provider system 102 of the linear video feed, along with VOD content assets for the new channel.

Figure 1C:
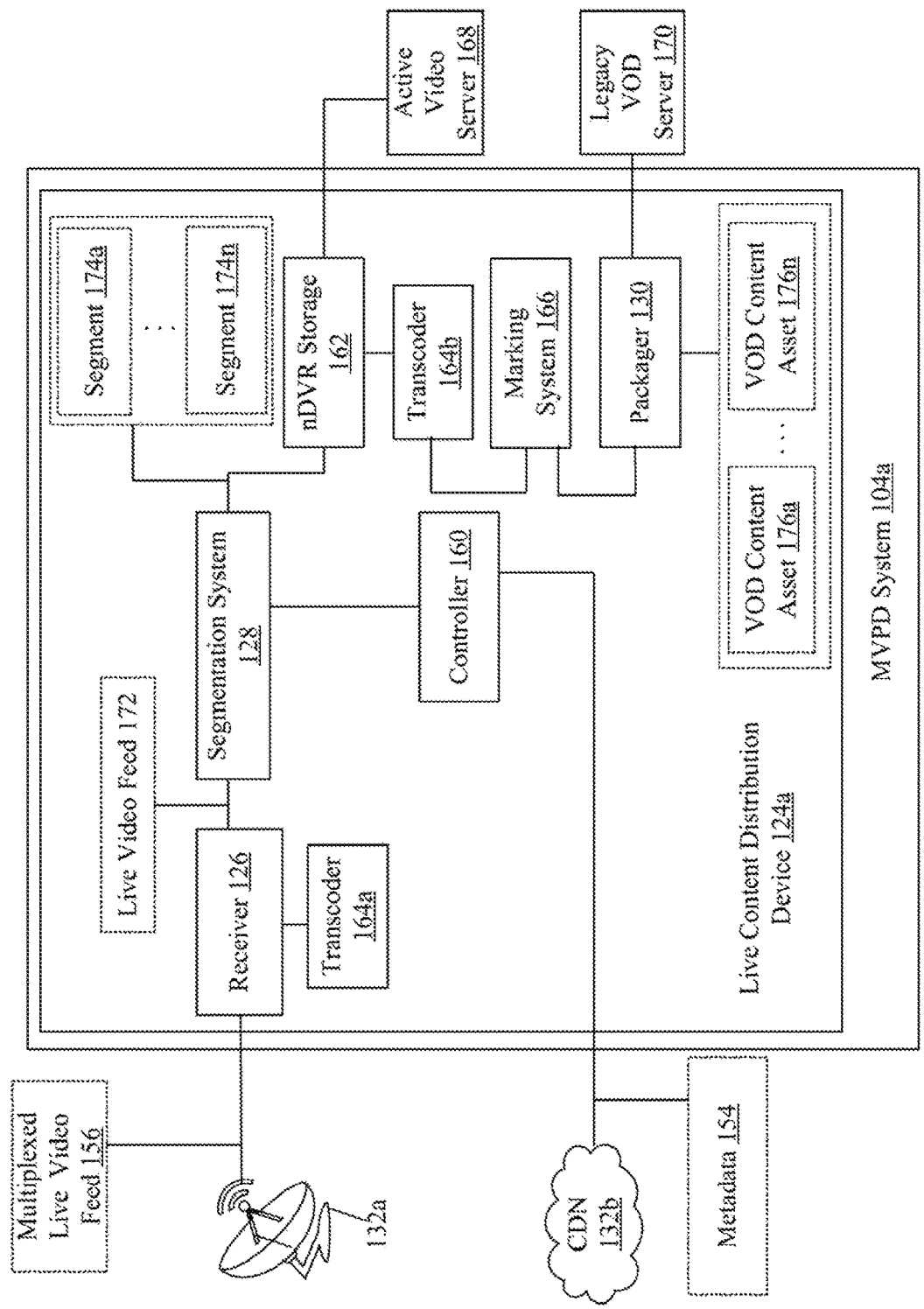
FIG. 1C is a block diagram that illustrates an exemplary live content distribution device in an exemplary MVPD system for dynamically generating one or more VOD content assets for playout, in accordance with an exemplary embodiment of the disclosure.

The television playout system 118 may playout the generated new channel. The trigger inserter 120 may insert the plurality of SCTE 104 cues or triggers in the linear video feed of the new channel received from the television playout system 118. Thereafter, the new channel may be encoded by varying bitrates and convert the SCTE-104-based digital commercial-marker to SCTE-35-based digital commercial-marker. The encoded new channel may be multiplexed with SCTE-224 message from LMDB 114 and communicated (or stored), via the network 132 (such as the satellite communication network 132a as shown in FIG. 1B), to the plurality of MVPD systems 104a, . . . , 104n for subsequent playout. In accordance with another embodiment, the metadata, as SCTE-224 message, may be communicated out-of-band separately from the new channel and the plurality of triggers. In accordance with another embodiment, the encoded new channel that includes the plurality of triggers may be communicated (or stored), via the network 132 (such as the satellite communication network 132a as shown in FIGS. 1B and 1C), to the plurality of MVPD systems 104a, . . . , 104n for subsequent playout. In such a case, the LMDB 114 separately communicates SCTE-224 message as out-of-band metadata to the plurality of MVPD systems 104a, . . . , 104n via another example of the network 132 (such as CDN network 132b of FIG. 1B).

FIG. 1B is a block diagram that illustrates an exemplary broadcast provider system for broadcasting encoded video feed of a channel to a plurality of MVPDs and generating a new channel comprising one or more VOD content assets, in accordance with an exemplary embodiment of the disclosure. The block diagram further illustrates the exemplary broadcast provider system for generating a new channel comprising one or more VOD content assets, in accordance with another exemplary embodiment of the disclosure. Referring to FIG. 1B, there are shown the traffic and scheduler system 112, the LMDB 114, the automation system 116, the television playout system 118, the trigger inserter 120, and the broadcasting apparatus 122, as described in FIG. 1A. The traffic and scheduler system 112 may be shown to be an integrated system that includes a traffic system 112a and a scheduler 112b. There are further shown a source device 133, one or more encoders 134a, . . . , 134n communicatively coupled with the trigger inserter 120 and a multiplexer (MUX) 136 in the broadcast provider system 102. The MUX 136 is further communicatively coupled with the broadcasting apparatus 122 and a data embedding system 138. There is further shown a content storage 140 communicatively coupled to the automation system 116 and the television playout system 118. There is also shown a playout schedule 142, a specific playout schedule 144, a plurality of advertisements and/or promotional content 146, a linear video feed 148, a linear video feed with triggers 150, an encoded linear video feed with triggers 152, metadata 154, a multiplexed live video feed 156, and a new channel 158.

In some embodiments of the disclosure, the television playout system 118 and the trigger inserter 120, may be integrated to form an integrated system. In some embodiments of the disclosure, the automation system 116 may be integrated with the television playout system 118, the trigger inserter 120, the one or more encoders 134a, . . . , 134n, the MUX 136, and the data embedding system 138, to form an integrated system. In some embodiments of the disclosure, the television playout system 118, the automation system 116, the trigger inserter 120, the one or more encoders 134a, . . . , 134n, the MUX 136, and the data embedding system 138, may be located separately, as shown. The functions and/or operations performed by the broadcast provider system 102, and its various components, are further described, in FIGS. 1B, 2A, 3A, and 4. Other separation and/or combination of the various entities of the exemplary broadcast provider system 102 illustrated in FIG. 1B may be done without departing from the spirit and scope of the various embodiments of the disclosure.

The traffic system 112a may comprise suitable logic, circuitry, and interfaces that may be configured to execute code that receives linear video feed 148 (also referred to as a network television live feed) from the source device 133. The received linear video feed 148 may correspond to a channel, such as CNN channel, that is to be broadcasted to the plurality of MVPD systems 104a, . . . , 104n, via the network 132. In accordance with an exemplary expect of the disclosure, the traffic system 112a may receive a specific playout schedule, such as a D4 schedule for a D4 channel, from a source device, such as the source device 133. The specific playout schedule is represented as the specific playout schedule 144 in FIG. 1B.

The scheduler 112b may comprise suitable logic, circuitry, and interfaces that may be configured to execute code that handles a programming schedule of a channel. The programming schedule of a channel defines what media content should be scheduled, the ordering of the media content during playout, and when to deliver content. The content that is delivered may include both the programming content, such as TV programs, and the non-programming content, such as advertisements or promotional media. In accordance with an embodiment, the programming schedule may be a text file or an XML file, which comprises a reference mapping of different media content items that need to be stitched by a stitcher (not shown). The scheduler 112b may modify existing programming schedule to generate a new programming schedule, where the generation of the new programming schedule may enable creation of new channels.

The one or more encoders 134a, . . . , 134n may comprise suitable logic, circuitry, and interfaces that may be configured to execute code that may be configured to receive the linear video feed with triggers 150 (as SCTE-104-inserted message) from the trigger inserter 120. The one or more encoders 134a, . . . , 134n may encode the SCTE-104 message and convert the SCTE-104 message to SCTE-35 message. The one or more encoders 134a, . . . , 134n may encode the linear video feed with triggers 150 by varying bitrates. An example of such one or more encoders 134a, . . . , 134n may be Mezzanine encoder, known in the art.

The MUX 136 may comprise suitable logic, circuitry, and interfaces that may be configured to execute code that may receive the encoded linear video feed with triggers 152 (as SCTE-35-based message) and multiplex with live metadata 154 related to the encoded linear video feed with triggers 152, which is received from the LMDB 114, in conjunction with the data embedding system 138. Thus, the MUX 136 may facilitate the broadcasting of the metadata 154 (as SCTE-224 message) along with the encoded linear video feed with triggers 152 (as SCTE-35 message) in one or more configurations. In accordance with a first configuration, the metadata 154 is broadcasted in-band with the encoded linear video feed with triggers 150, via the satellite communication network 132a. In accordance with a second configuration, the metadata 154 is broadcasted out-of-band separate from the encoded linear video feed with triggers 150, via the CDN network 132b.

The data embedding system 138 may comprise suitable logic, circuitry, and interfaces that may be configured to execute code that may receive the live metadata 154 from the LMDB 114 and transmit it to the MUX 136 where the live metadata 154 is multiplexed with the encoded linear video feed with triggers 152. Accordingly, the live metadata 154 is broadcasted in-band with the encoded linear video feed with triggers 152.

The content storage 140 may comprise suitable logic, circuitry, and interfaces that may be configured to execute code that may receive requests from the automation system 116 for required additional content in accordance with the playout schedule 142. Further, the content storage 140 may provide such additional content to the television playout system 118 also in real-time.

The playout schedule 142 may correspond to a schedule pertaining to a playout of the programming data and the plurality of advertisements and/or promotional content 146. The playout schedule 142 may also be referred to as a programming schedule. The playout schedule 142 may include an ordering of the programming data and the plurality of advertisements and/or promotional content 146. During the playout, the programming data and the plurality of advertisements and/or promotional content 146 are played out in the corresponding order as specified in the playout schedule 142. The scheduler 112b may be configured to generate the playout schedule 142. In accordance with an embodiment, the playout schedule 142 may include information, such as after a series episode airs live, if a viewer watches the same set of commercials in an episode within 3 days, the network provider, gets Nielsen "C3" credit.

The specific playout schedule 144 may be received from a specific source device 133, such as "D4 schedule source," based on which the new channel 158 may be generated. The specific playout schedule 144 may include one or more scheduling rules that correspond to the linear video feed 148 of a channel broadcasted to the plurality of MVPD systems 104a, . . . , 104n. A first exemplary scheduling rule may correspond to sanitization of the received linear video feed 148 of the channel by removal of a lower third graphical content overlay from the linear video feed 148 for the generation of the new channel 158. A second exemplary scheduling rule may correspond to insertion of a discontinuity between program segments to allow dynamic advertisement insertion (DAI) within the program segments of the linear video feed 148 for the new channel 158. A third exemplary scheduling rule may correspond to insertion of a unique source identifier/time in content in the linear video feed 148 for the new channel 158. A fourth exemplary scheduling rule may correspond to insertion of new promotional content items, specific to the broadcast provider system 102 of the linear video feed 148, along with VOD content assets for the new channel 158. The specific playout schedule 144 may further include a time at which the new channel 158 may be generated and broadcasted to the plurality of MVPD systems 104a, . . . , 104n.

The programming data and the plurality of advertisements and/or promotional content 146 may correspond to the content received form the plurality of advertiser order generation systems 110a, . . . , 110n based on which the playout schedule 142 is dynamically updated by the scheduler 112b. The programming data may include a plurality of program segments of main program content, such as TV shows, TV programs, Live content, and/or VOD content, separated by one or more commercial breaks. The plurality of advertisements and/or promotional content 146 may correspond to media items that are to be inserted at the plurality of spots or inventory buckets related to the one or more commercial breaks in the linear video feed 148.

The linear video feed 148 may correspond to a linear stream of multimedia frames of programming data provided by a content source. The linear video feed 148 may correspond to an uncompressed SDI video and may be embedded with the ancillary data, such as the close caption data, format definition data, VITC, and/or the like in the broadcast chain during playout by the television playout system 118.

The linear video feed with triggers 150 may correspond to the uncompressed SDI video that is inserted with the plurality of triggers by the trigger inserter 120 and may correspond to SCTE-104-inserted message. The SCTE-104-based digital ad-marker may be inserted in the SDI video as vertical ancillary (VANC) data. The SCTE-104 is in 10-bit hexadecimal format so as to match data words in the uncompressed SDI video.

The encoded linear video feed with triggers 152 may correspond to the uncompressed SDI video that is inserted with the plurality of triggers and may correspond to SCTE-104 message. SCTE-104-based digital ad-marker may be inserted in the SDI video as vertical ancillary (VANC) data. The SCTE-104 is in 10-bit hexadecimal format so as to match data words in the uncompressed SDI video corresponding to the linear video feed 148.

The metadata 154 may correspond to information related to the programming data stored in the LMDB 114. The metadata 154 may be based on first and second information received by the LMDB 114 from the traffic and scheduler system 112 and the automation system 116, respectively. The first information received from the traffic and scheduler system 112 may be associated with the playout schedule 142 or the specific playout schedule 144. The second information received from the automation system 116 may be associated with an updated playout schedule or an updated specific playout schedule. In accordance with an embodiment, the metadata 154 may be distributed by the LMDB 114 to the plurality of MVPD systems 104a, . . . , 104n or external affiliates for individual networks via SCTE-224 message separately through separate CDN network 132b. In accordance with an embodiment, the metadata 154 may be distributed by the LMDB 114 to the plurality of MVPD systems 104a, . . . , 104n or external affiliates as in-band data in the multiplexed live video feed 156, via the satellite communication network 132a. In accordance with an embodiment, the metadata 154 may be distributed by the LMDB 114 to the plurality of MVPD systems 104a, . . . , 104n or external affiliates as out-of-band data separate from the multiplexed live video feed 156, via the CDN network 132b. Examples of the metadata 154 may include item identifiers in the linear video feed 148, titles, file formats, encryption information, timing information associated with one or more commercial breaks, a playout schedule to play the one or more advertisements and/or promotional content 146 within programming data of the linear video feed 148, and signaling content of the linear video feed 148.

The multiplexed live video feed 156 may correspond to the encoded linear video feed with triggers 152 (SCTE 104 message) received from the one or more encoders 134a, . . . , 134n multiplexed with the metadata 154 received from the data embedding system 138. In accordance with an embodiment, the broadcasting apparatus 122 transmits channels corresponding to the multiplexed live video feed 156 as unencrypted and are therefore free-to-air or free-to-view. In accordance with another embodiment, the broadcasting apparatus 122 transmits channels with encryption (pay television), and thus requiring a subscription by the plurality of consumer devices 108a, . . . , 108n via the plurality of MVPD systems 104a, . . . , 104n. In such a case, the encryption may be based on CA or DRM technology, known in the art.

In accordance with an embodiment, the new channel 158, such as a D4 channel, may be generated by the broadcast provider system 102 based on the one or more scheduling rules of the specific playout schedule 144 (i.e. D4 schedule). The new channel 158 thus generated may include one or more VOD content assets that may be transmitted to the plurality of MVPD systems 104a, . . . , 104n via a different communication medium of the network at the time specified in the specific playout schedule 144. In accordance with an embodiment, based on the "C3" content, an integrated system comprising the television playout system 118, the trigger inserter 120, and the one or more encoders 134a, . . . , 134n in the broadcast provider system 102 may be configured to generate the new channel 158, "D4 channel," which may be broadcasted on day "4" of the originally aired live video feed, i.e. the multiplexed live video feed 156.

FIG. 1C is a block diagram that illustrates an exemplary MVPD system for dynamically generating one or more VOD content assets for playout, in accordance with an exemplary embodiment of the disclosure. Referring to FIG. 1C, there is shown an MVPD system 104a of the plurality of MVPD systems 104a, . . . , 104n for brevity. Notwithstanding, it may be understood that the functionality of the remaining MVPD systems of the plurality of MVPD systems 104a, . . . , 104n is similar to the functionality of the MVPD system 104a (described in FIG. 1A), without any deviation from the scope of the disclosure. There are shown a live content distribution device 124a in the MVPD system 104a. The live content distribution device 124a may be provided in an MVPD headend of the MVPD system 104a associated with an affiliate. There is further shown the receiver 126, the segmentation system 128, and the packager 130. There is further shown a controller 160, a network DVR (nDVR) storage 162, one or more transcoders, such as a transcoder 164b, and a marking system 166 in the live content distribution device 124a. There is further shown two servers, an active video server 168 and a legacy VOD server 170 communicatively coupled to the live content distribution device 124a. The active video server 168 and the legacy VOD server 170 may be further communicatively coupled to the plurality of consumer devices 108a, . . . , 108n (FIG. 1A). There is further shown the multiplexed live video feed 156 received from the broadcast provider system 102. A live video feed 172, a plurality of segments 174a, . . . , 174n, and one or more VOD content assets 176a, . . . , 176n, are also shown.

The controller 160 may comprise suitable logic, circuitry, and interfaces that may be operable to execute code that may be configured to receive the SCTE-224-based message from the LMDB 114, via the CDN network 132b, to control the segmentation system 128. The controller 160 may be configured to control the segmentation system 128 for the generation of the plurality of segments 174a, . . . , 174n based on the metadata 154 and the plurality of triggers in the received multiplexed live video feed 156. In accordance with an embodiment, the controller 160 may not be required when the receiver 126 receives the SCTE-224 message corresponding to the metadata 154, in-band with the SCTE-35-based message in the multiplexed live video feed 156.

The nDVR storage 162 may comprise suitable logic, circuitry, and interfaces that may be operable to execute code that may be configured to capture, for example, raw MPEG-2 TS of the plurality of segments 174a, . . . , 174n and associated metadata 154. The MPEG-2 TS may comprise adaptive transport stream (ATS) metadata comprising encoding boundary points (EBP) and may act as a source for both live and on demand packaging. In an exemplary embodiment, the nDVR storage 162 may be configured to store approximately 75 hours of content. However, the capacity of the nDVR storage 162 may be increased based on enhanced hardware memory storage devices utilized to realize the nDVR storage 162, without deviation from the scope of the disclosure.

The nDVR storage 162 may store the plurality of segments 174a, . . . , 174n generated from the live video feed 172 by the segmentation system 128. The nDVR storage 162 may be further configured to store the metadata 154, associated with the plurality of segments 174a, . . . , 174n, received through the controller 160. In accordance with an embodiment, the plurality of segments 174a, . . . , 174n and the associated metadata 154 may be stored in the nDVR storage 162 in accordance with various versions, such as "C3", "C7", or "Cx". In accordance with an embodiment, the stored plurality of segments 174a, . . . , 174n may be directly retrieved from the nDVR storage 162 by the active video server 168 for playout. In accordance with an embodiment, the stored plurality of segments 174a, . . . , 174n may be retrieved from the nDVR storage 162 by the one or more transcoders 164a and 164b and the marking system 166 for the packager 130 that generates the one or more VOD assets 176a, . . . , 176n for the legacy VOD server 170.

The one or more transcoders, such as the transcoders 164a and 164b, in the live content distribution device 124a may comprise suitable logic, circuitry, and interfaces that may be configured to execute code to decode a video feed from one format to an uncompressed format, and then re-encoding the uncompressed video feed to the desired digital format. In an example, a transcoder, such as the transcoder 164a, of the one or more transcoders may be communicatively coupled with the receiver 126. In another example, a transcoder, such as the transcoder 164b, of the one or more transcoders may be communicatively coupled with the marking system 166.

The marking system 166 may comprise suitable logic, circuitry, and interfaces that may be operable to execute code that may be configured to introduce watermarks in the plurality of segments 174a, . . . , 174n received from the transcoder 164b. In accordance with an embodiment, the marking system 166 may introduce the watermarks, such as Nielsen source identifier (SID)/time in content (TIC), in the plurality of segments 174a, . . . , 174n based on Nielsen VOD content encoding application, known in the art. The marking system 166 may further communicate the watermarked plurality of segments 174a, . . . , 174n (as watermarked MPEG-2 TS segments) to the packager 130.

The active video server 168 may comprise suitable logic, circuitry, and interfaces that may be operable to execute code that may be configured to receive live video origin content that may be output from the nDVR storage 162. In this regard, the live video origin content may correspond to various exemplary hypertext transfer protocol (HTTP) formats, such as HLS, protected HLS, Smooth Streaming, and dynamic adaptive streaming over HTTP (Dash).

The legacy VOD server 170 may comprise suitable logic, circuitry, and interfaces that may be operable to execute code that may be configured to receive one or more VOD content assets from the packager 130. Although already encoded content may be extracted from the legacy VOD server 170, there may be use cases and examples where rules for one or more advertisements and/or promotional content change between live and the "C3" window, DRM license rights change from 24 hours to 75 hours, Nielsen ID3 tags change from the live tags to VOD tags, and encryption rules may change in order to extract clips or segments to share that do not require any encryption or DRM protection. Leveraging access to the incoming MPEG-2 TS via the packager 130 enables the creation of such kinds of on-demand content. The packager 130 may enable the creation of multiple VOD content assets with different properties—DRM enabled version of content, no DRM enabled version of content, encrypted version of content, non-encrypted (clear) version of content.

The live video feed 172 may be received from the receiver 126 communicatively coupled with the transcoder 164a. The live video feed 172 may correspond to a demultiplexed stream, from which the CA or DRM encryption is removed by the receiver 126. The format of the live video feed 172 may be, for example, MPEG-2 TS (MPTS), compatible with the MVPD system 104a, which may be converted by the transcoder 164a from the format of the multiplexed live video feed 156, which may be the MPTS. The transcoded live video feed 172 may be provided to the segmentation system 128.

Each of the plurality of segments 174a, . . . , 174n may correspond to a chunk of the transcoded live video feed 172 which is generated based on the plurality of triggers in the SCTE-35 message and metadata in the SCTE-224-based message in the live video feed 172. The format of each of the plurality of segments 174a, . . . , 174n may correspond to an MPEG-2 TS that may comprise ATS metadata comprising EBP and may act as a source for both live and on demand packaging.

Each of the one or more VOD content assets 176a, . . . , 176n may correspond to a unit of media content that includes media content (audio and video content). Examples of the one or more VOD content assets 176a, . . . , 176n may include, but are not limited to, movies, television programs, news programs, advertisements, video clips, audio (e.g., radio) programs, audio clips, and trick files. The one or more VOD content assets 176a, . . . , 176n may include recorded live content (e.g., a live sports game) and/or pre-recorded content, or pre-scheduled broadcast content. The one or more VOD content assets 176a, . . . , 176n may also include metadata that is descriptive of the VOD content asset and/or the content therein. Examples of such metadata may include or otherwise indicate description of content, date or date range, time length of the content, data size of the content, format of the content, bit rate of the content, and the like of each of the one or more VOD content assets 176a, . . . , 176n.

Figure 1D:
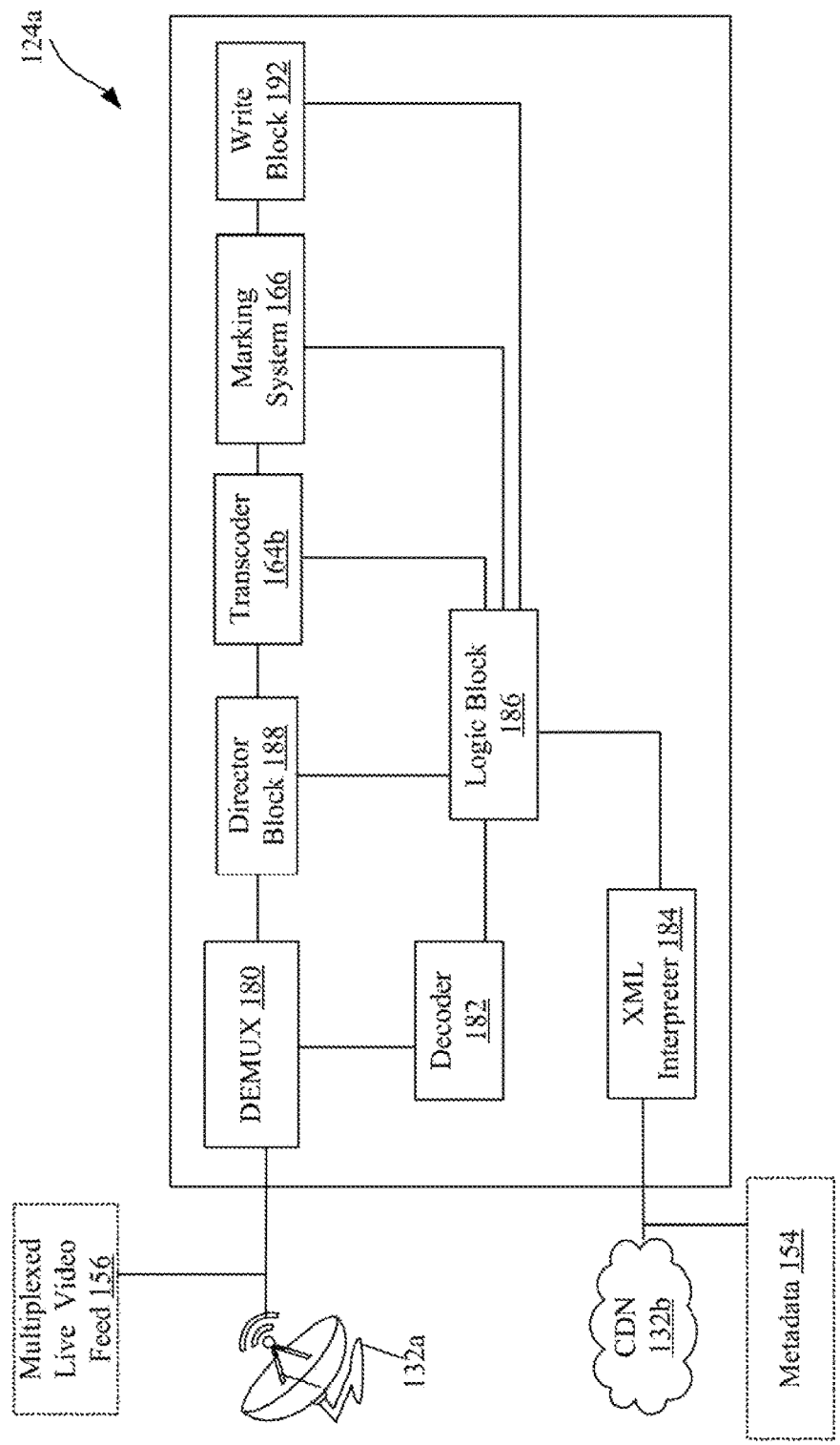
FIG. 1D is a circuit diagram illustrating an integrated system, in accordance with an exemplary embodiment of the disclosure.

FIG. 1D is a circuit diagram illustrating an integrated system, in accordance with an exemplary embodiment of the disclosure. The integrated system may include various components associated with the segmentation system 128, the controller 160, and the packager 130 in an exemplary live content distribution device, such as the live content distribution device 124a, as described in FIG. 1C. Notwithstanding, it may be understood that the circuit diagram and the functionality of the integrated system (that includes segmentation system, controller, and packager) in each of the remaining live content distribution devices 124b, . . . , 124n of the remaining plurality of MVPD systems 104b, . . . , 104n is similar to the circuit diagram and the functionality of the integration system (that includes the segmentation system 128, the controller 160, and the packager 130) in the live content distribution device 124a of the MVPD system 104a, without any deviation from the scope of the disclosure. The segmentation system 128 may include a demultiplexer (DEMUX) 180, an SCTE-35 decoder 182, an XML interpreter 184, a logic block 186, a director block 188, the transcoder 164b, the marking system 166, and a write block 192.

The DEMUX 180 receives the multiplexed live video feed 156 broadcasted by the broadcast provider system 102 through the network 132. The multiplexed live video feed 156 may correspond to an MPTS and comprise SCTE-35 and SCTE-224 message. The DEMUX 180 demultiplexes the SCTE-35 message in the received multiplexed live video feed 156 into a plurality of programs (or packets) and generates the live video feed 172 (as shown in FIG. 1C). Each packet in the live video feed 172 may include a packet identifier (PID). One or more of the plurality of programs (or packets) may include information about the other packets. The DEMUX 180 further determines program-specific information (PSI) data which is metadata about the plurality of packets and a part of an MPEG TS of the live video feed 172. The PSI data, as defined by ISO/IEC 13818-1, may include various tables, such as program association table, conditional access table, program map table, and network information table, required by the logic block 186.

Accordingly, the DEMUX 180 transmits the plurality of packets to the SCTE-35 decoder 182 and the director block 188. The SCTE-35 decoder 182 decodes the packets and identifies the plurality of triggers, such as program start, and transmits to the logic block 186. The XML interpreter 184 in the controller 160 receives the SCTE-224 message in the received live video feed 172. The XML interpreter 184 parses the SCTE-224 message and provides parameters, such as airing identifier (i.e. airing_ID) to the logic block 186. The airing_ID links the file in the SCTE-224 to the corresponding file in the queue of SCTE-35 message. The logic block 186 correlates the outputs of the SCTE-35 decoder 182 and XML interpreter 184, and determines what is to be recorded, requirement of the transcoding, Nielsen watermarks, and the like, associated with one or more presentation timestamps (PTS) of the packets. For example, the SCTE-35 message may indicate that the program start at timestamp is 50,000, the director block 188, based on the PSI information may indicate that the audio of the audio-visual program is in a specific language, such as English or Spanish. The director block 188 may receive input from the logic block 186 regarding data associated with the SCTE-35 and SCTE-224 message, and determine that the recording time is 50,000. The director block 188 transmits the SCTE-35 and further SCTE-36 and SCTE-39 message to the transcoder 164b. The director block 188 further trashes other packets which are not suitable to be transmitted to the transcoder 164b.

The transcoder 164b may utilize the CableLabs® encoding profiles to transcode the input to an MPEG-2 TS and transmit the stream to the marking system 166. The marking system 166 may include specific watermarks, such as Nielson SID/TIC, and forward the watermarked stream to the write block 192. The Nielson SID/TIC may indicate that the stream corresponds to a VOD asset comprising attributes like fast forward, and disable. The write block 192 may write or store the watermarked stream to the nDVR storage 162 with corresponding metadata. The watermarked stream may be utilized by the packager 130 thereafter to generate ADI package based on which the one or more VOD content assets 176a, . . . , 176n are dynamically generated. Similar steps, as stated above, may be performed by the integrated system to write other watermarked streams corresponding to other SCTE-35 message.

Figure 2:
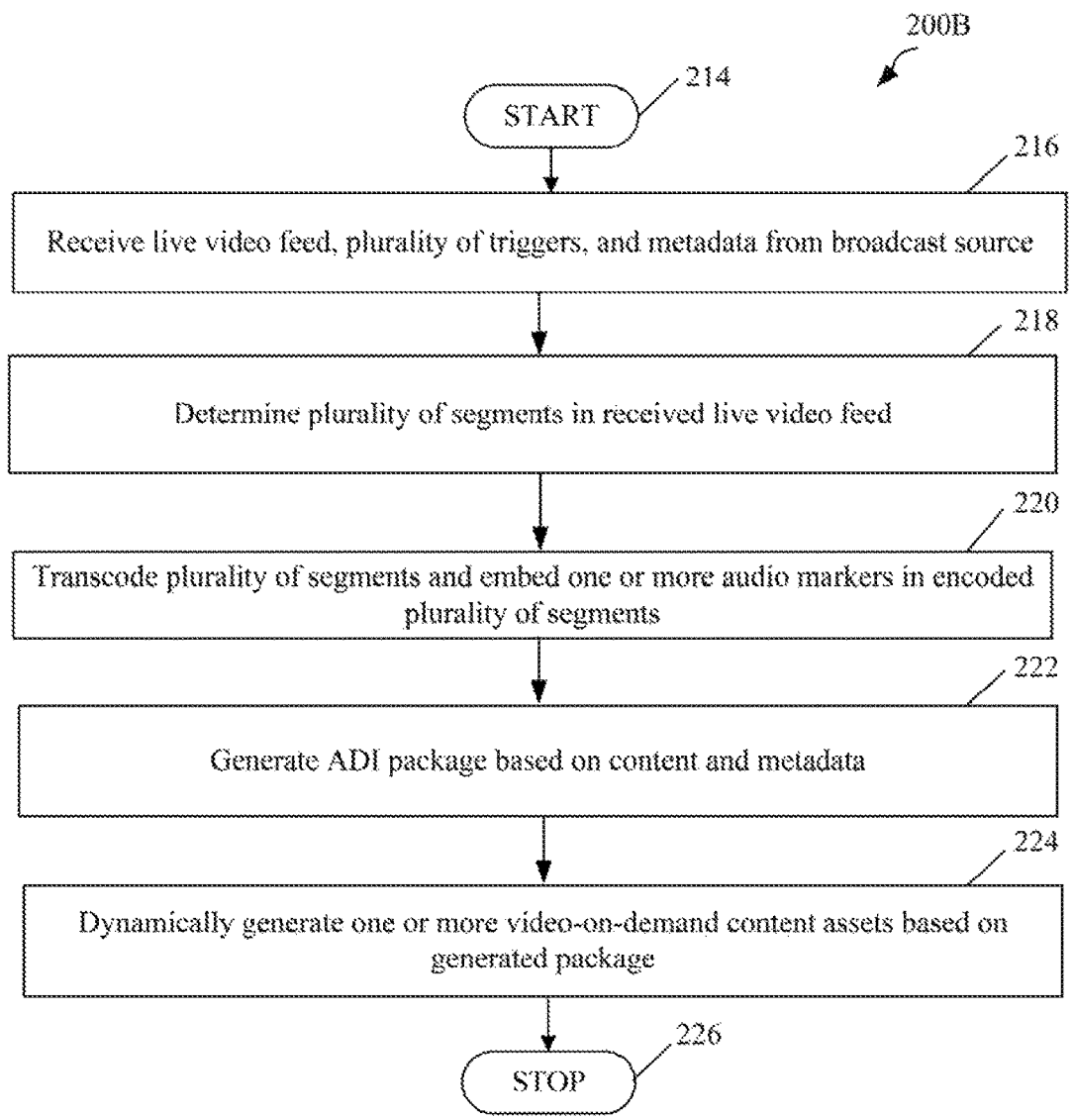
FIG. 2 depicts a flow chart illustrating high-level operation of an exemplary an exemplary live content distribution device of FIG. 1C, in accordance with an exemplary embodiment of the disclosure.

FIG. 2 depicts a flow chart illustrating high-level operation of an exemplary an exemplary live content distribution device of FIG. 1C, in accordance with an exemplary embodiment of the disclosure. Referring to FIG. 2, there is shown a flow chart 200B comprising exemplary operations 214 through 226. The exemplary operations may start at 214 and proceed to 216.

At 216, receive a live video feed, a plurality of triggers, and metadata from the broadcast provider system 102 over the communication network (such as the satellite communication network 132a). The receiver 126 in the live content distribution device 124a may be configured to receive the live video feed (such as the multiplexed live video feed 156), the plurality of triggers, and the metadata (such as the metadata 154) from the broadcast provider system 102 over the communication network (such as the satellite communication network 132a). In a scenario, the received live video feed (such as the multiplexed live video feed 156) may not be embedded with the metadata 154. In such a case, the live content distribution device 124a may receive the metadata 154 separately from the LMDB 114, via the CDN network 132b. The receiver 126 may be further configured to demultiplex the received multiplexed live video feed 156 and may further remove the CA or DRM encryption from the demultiplexed live video feed to generate the live video feed 172. The transcoder 164a may further convert the format of the live video feed 172 into another format compatible with the MVPD system 104a.

At 218, a plurality of segments (such as the plurality of segments 174a, . . . , 174n) may be determined in the received live video feed 172 based on the received plurality of triggers and the metadata 154. The segmentation system 128 may be configured to determine the plurality of segments 174a, . . . , 174n in the received live video feed 172 based on the received plurality of triggers and the metadata 154. For example, each of the plurality of segments 174a, . . . , 174n may be generated based on the plurality of triggers in the SCTE-35 message and metadata in the SCTE-224 message of the live video feed 172. The format of each of the plurality of segments 174a, . . . , 174n may correspond to an MPEG-2 TS that may comprise ATS metadata comprising EBP and may act as a source for both live and on demand packaging. The segmentation system 128 may be controlled by the controller 160 for the generation of the plurality of segments 174a, . . . , 174n, in an event the metadata 154 is not received in the received multiplexed live video feed 156. The plurality of segments 174a, . . . , 174n along with the plurality of triggers and the metadata 154 may be stored in the nDVR storage 162 in a video stream format. In accordance with an embodiment, the stored plurality of segments 174a, . . . , 174n may be communicated to the active video server 168. In accordance with another embodiment, the stored plurality of segments 174a, . . . , 174n may be communicated to the transcoder 164b.

At 220, the plurality of segments 174a, . . . , 174n may be transcoded and one or more audio markers may be embedded in the encoded plurality of segments 174a, . . . , 174n. The transcoder 164b may be configured to transcode plurality of segments 174a, . . . , 174n. For transcoding, the transcoder 164b may decode each of the plurality of segments 174a, . . . , 174n from the corresponding format to an uncompressed format, and may further re-encode each of the plurality of segments 174a, . . . , 174n to a desired digital format, such as the MPEG-2 TS format. The re-encoded plurality of segments 174a, . . . , 174n is further communicated to the marking system 166. The marking system 166 may be configured to embed one or more audio markers, such as the Nielson TIC watermarks, in the encoded plurality of segments 174a, . . . , 174n based on based on Nielsen VOD content encoding application. The Nielson TIC may indicate that the stream corresponds to a VOD asset comprising attributes like fast forward, and disable. The watermarked stream of the encoded plurality of segments 174a, . . . , 174n may be further stored in the nDVR storage 162 with corresponding metadata 154.

At 222, ADI package may be generated based on the content and the metadata 154. The packager 130 may be configured to generate the ADI package based on the content and the metadata 154. The content may refer to the stream of the encoded plurality of segments 174a, . . . , 174n transcoded to MPEG2 TS and marked with Nielson markers. The packager 130 may retrieve the stored stream of the encoded plurality of segments 174a, . . . , 174n with corresponding metadata 154 from the nDVR storage 162 for generating the ADI package.

At 224, one or more VOD content assets may be dynamically generated based on the package (such as the ADI package). The packager 130 may be further configured to dynamically generate (and/or stitch) the one or more VOD content assets (such as the one or more VOD content assets 176a, . . . , 176n) based on the generated ADI package. The one or more VOD content assets 176a, . . . , 176n may correspond to a unit of media content that includes audio and/or video content. The one or more VOD content assets 176a, . . . , 176n may be generated with different properties, such as DRM enabled version of the content, no DRM enabled version of the content, encrypted version of the content, non-encrypted (clear) version of the content. The one or more VOD content assets 176a, . . . , 176n may be further communicated to the legacy VOD server 170. Control passes to end step 226.

Figure 3:
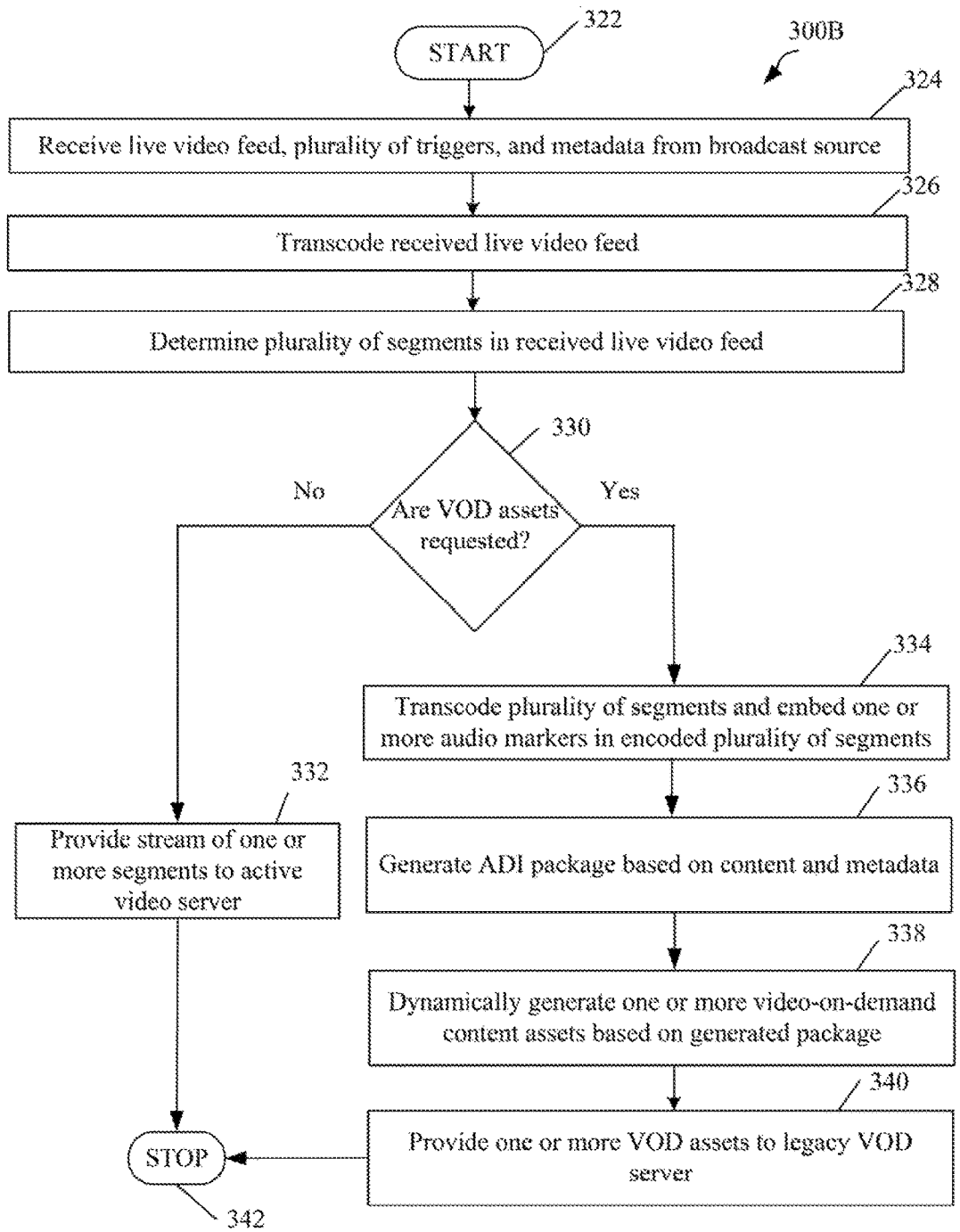
FIG. 3 depicts a flow chart illustrating exemplary operations for generating a new channel comprising one or more VOD content assets, in accordance with an exemplary embodiment of the disclosure.

FIG. 3 depicts a flow chart illustrating exemplary operations for dynamically generating VOD assets for MVPDs, in accordance with an exemplary embodiment of the disclosure. Referring to FIG. 3, there is shown a flow chart 300B comprising exemplary operations 322 to 342. The exemplary operations may start at 322 and proceed to 324.

At 324, the receiver 126 may be configured to receive the multiplexed live video feed 156, the plurality of triggers, and the metadata 154 from a broadcast source, such as the broadcasting apparatus 122 of the broadcast provider system 102, over the satellite communication network 132a. In accordance with an embodiment, the metadata 154, as SCTE-224 message, may be embedded in the multiplexed live video feed 156, as SCTE-35 message. In accordance with an embodiment, the metadata 154 may not be embedded in the multiplexed live video feed 156. In such a case, the receiver 126 may receive the metadata 154 as SCTE-224 message, separately from the LMDB 114, via the CDN network 132b. The receiver 126 may demultiplex the received multiplexed live video feed 156 and may further remove the CA or DRM encryption to generate the live video feed 172.

At 326, the received live video feed 172 may be transcoded. The transcoder 164a may be configured to transcode the live video feed 172. For transcoding the live video feed 172, the transcoder 164a may further convert the current format of the live video feed 172 into another format that is compatible with the MVPD system 104a, such as MPTS format.

At 328, the segmentation system 128 may be configured to determine the plurality of segments 174a, . . . , 174n based on the plurality of triggers in the SCTE-35 message and the metadata 154 in the SCTE-224 message of the live video feed 172. The live video feed 172 may comprise SCTE-35 and SCTE-224 messages either separately, or multiplexed with each other. The format of each of the plurality of segments 174a, . . . , 174n may correspond to an MPEG-2

TS that may comprise ATS metadata comprising EBP and may act as a source for both live and on demand packaging. The segmentation system 128 may be controlled by the controller 160 for the generation of the plurality of segments 174a, ..., 174n, in an event the metadata 154 is not received in the received multiplexed live video feed 156. The plurality of segments 174a, ..., 174n along with the plurality of triggers and the metadata 154 may be stored in the nDVR storage 162 in a video stream format.

At 330, it may be determined whether the VOD assets are requested by a consumer device, such as the consumer device 108a in the plurality of consumer devices 108a, ..., 108n. The control may pass to operation 332, based on the determination that the consumer device has not requested for the VOD assets. Else, the control may pass to operation 334.

At 332, the stream of one or more segments may be provided to the active video server 168 based on the determination that the consumer device 108a has not requested for the VOD assets. The live content distribution device 124a may provide the stream of one or more segments of the plurality of segments 174a, ..., 174n to the active video server 168. The stream of one or more segments provided to the active video server 168 may refer to live video origin content which may comply with various HTTP formats such as HLS, protected HLS, Smooth Streams, and Dash. The control may then pass to end operation 342.

At 334, the transcoder 164b may transcode the plurality of segments 174a, ..., 174n and the marking system 166 may embed the one or more audio markers in the encoded plurality of segments 174a, ..., 174n, based on the determination that the consumer device 108a has requested for the VOD assets. The transcoder 164b may decode each of the plurality of segments 174a, ..., 174n from the corresponding current format to an uncompressed format, and may further re-encode each of the plurality of segments 174a, ..., 174n to a desired digital format, such as the MPEG-2 TS format. The marking system 166 may be configured to embed one or more audio markers, such as the Nielson SID/TIC watermarks, in the encoded plurality of segments 174a, ..., 174n based on Nielsen VOD content encoding application. The Nielson SID/TIC may indicate that the stream corresponds to a VOD asset comprising attributes like fast forward, and disable. The watermarked stream of the encoded plurality of segments 174a, , 174n may be further stored in the nDVR storage 162 with corresponding metadata 154.

At 336, the packager 130 may be configured to generate the ADI package based on the content and the metadata 154. The content may refer to the stream of the plurality of segments 174a, ..., 174n that is transcoded to MPEG2 TS and marked with Nielson markers. The metadata may be standardized by various known standards, such as Cable-Labs®. The packager 130 may retrieve the stored stream of the encoded plurality of segments 174a, ..., 174n with corresponding metadata 154 from the nDVR storage 162 for generating the ADI package.

At 338, packager 130 may be configured to dynamically generate the one or more VOD content assets (such as the one or more VOD content assets 176a, ..., 176n) based on the package (such as the generated ADI package). Each of the one or more VOD content assets 176a, ..., 176n may correspond to a unit of media content that includes audio and/or video content. The one or more VOD content assets 176a, ..., 176n may be generated with different properties, such as DRM enabled version of the content, no DRM enabled version of the content, encrypted version of the content, non-encrypted (clear) version of the content.

At 340, the one or more VOD content assets 176a, ..., 176n may be provided to the legacy VOD server 170. The packager 130 may be configured to provide the one or more VOD content assets 176a, ..., 176n to the legacy VOD server 170 for storage. In accordance with an embodiment, the packager 130 may be configured to provide the one or more VOD content assets 176a, ..., 176n in a specific stitched ordering as a program stream as per one or more defined programming schedules or as individual VOD content assets to be re-used later on. The control may pass to end 342.

Figure 4:
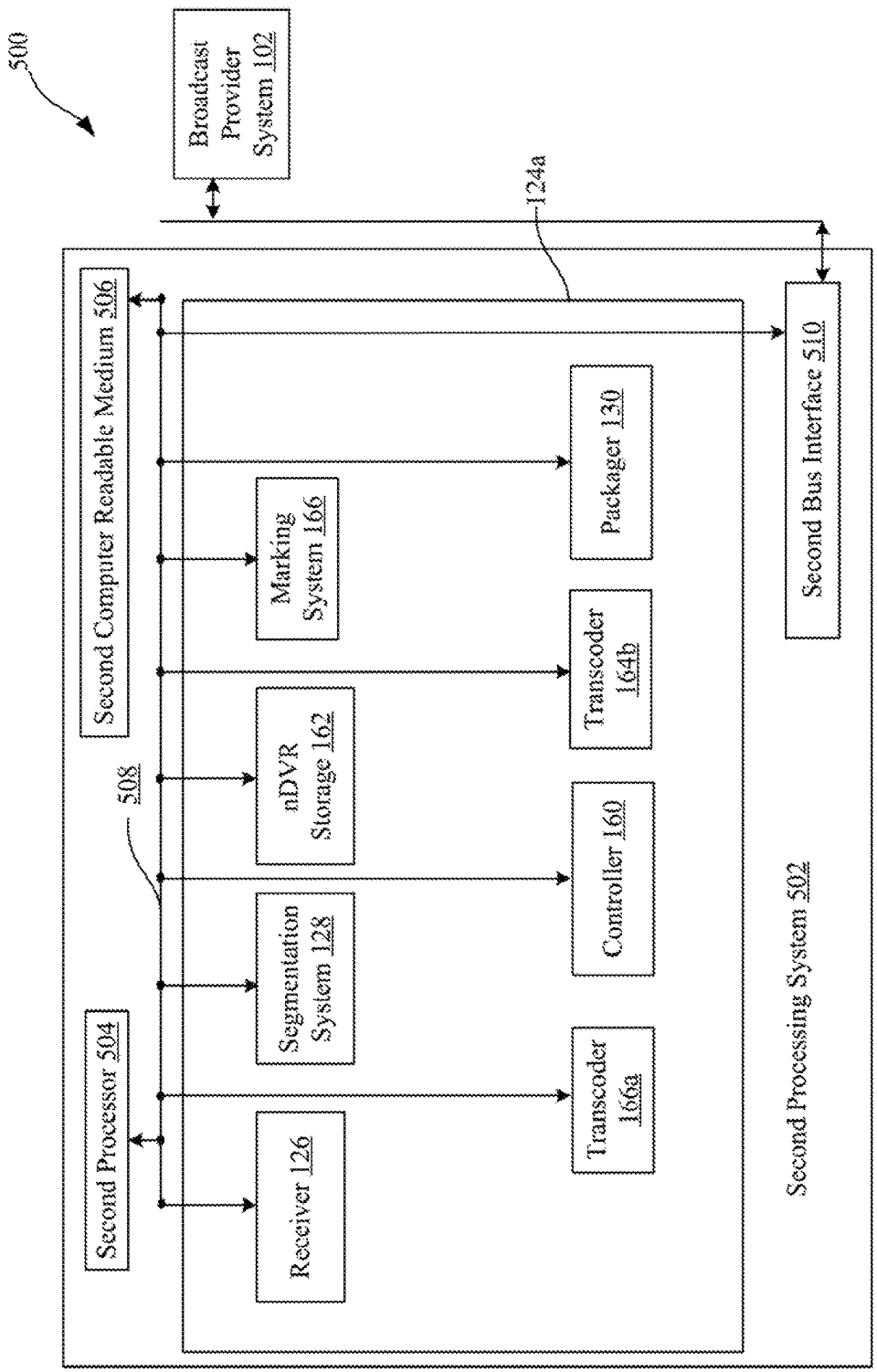
FIG. 4 is a conceptual diagram illustrating an example of a hardware implementation for an exemplary live content distribution device in an exemplary MVPD system, in accordance with an exemplary embodiment of the disclosure.

FIG. 4 is a conceptual diagram illustrating an example of a hardware implementation for an exemplary live content distribution device in an exemplary MVPD system, in accordance with an exemplary embodiment of the disclosure. Referring to FIG. 4, the hardware implementation shown by a representation 500 for an MVPD system (such as the MVPD system 104a) in the plurality of MVPD systems 104a, ..., 104n employs a processing system 502 for providing video programming services to viewers, in accordance with an exemplary embodiment of the disclosure, as described herein. In some examples, the processing system 502 may comprise one or more hardware processors 504, a non-transitory computer-readable medium 506, a hardware live content distribution device 124a, a hardware receiver 126, a hardware segmentation system 128, a hardware packager 130, a hardware active video server 168, and a hardware legacy VOD server 170. The live content distribution device 124a may further comprise a hardware controller 160, a hardware nDVR storage 162, a hardware marking system 166, and one or more hardware transcoders 164a, ..., 164n.

In this example, the MVPD system 104a employing the processing system 502 may be implemented with a bus architecture, represented generally by a bus 508. The bus 508 may include any number of interconnecting buses and bridges depending on the specific implementation of the MVPD system 104a and the overall design constraints. The bus 508 links together various circuits including the one or more processors, represented generally by the processor 504, the non-transitory computer-readable media, represented generally by the computer-readable medium 506, the hardware live content distribution device 124a, the hardware receiver 126, the hardware segmentation system 128, the hardware packager 130, the hardware active video server 168, and the hardware legacy VOD server 170, which may be configured to carry out one or more operations or methods described herein. A bus interface 510 provides an interface between the bus 508 and a transceiver 512. The transceiver 512 provides a means for communicating via the network 132 with various other apparatus, such as the broadcast provider system 102, the plurality of published data sources 106a, ..., 106n, the plurality of consumer devices 108a, ..., 108n, and the plurality of advertiser order generation systems 110a, ..., 110n.

The processor 504 may be configured to manage the bus 508 and general processing, including the execution of a set of instructions stored on the computer-readable medium 506. The set of instructions, when executed by the processor 504, causes the MVPD system 104a to execute the various functions described herein for any particular apparatus. The computer-readable medium 506 may also be used for storing data that is manipulated by the processor 504 when executing the set of instructions. The computer-readable medium 506 may also be configured to store data for one or more of the hardware live content distribution device 124a, the hardware receiver 126, the hardware segmentation system 128, the hardware packager 130, the hardware active video server 168, and the hardware legacy VOD server 170.

In an aspect of the disclosure, the processor 504, the computer-readable medium 506, or a combination of both may be configured or otherwise specially programmed to execute the operations or functionality of the hardware live content distribution device 124a, the hardware receiver 126, the hardware segmentation system 128, the hardware packager 130, the hardware active video server 168, and/or the hardware legacy VOD server 170, or various other components described herein. For example, the processor 504, the computer-readable medium 506, or a combination of both may be configured or otherwise specially programmed to perform the operations and functionality of the hardware live content distribution device 124a, the hardware receiver 126, the hardware segmentation system 128, the hardware packager 130, the hardware active video server 168, and/or the hardware legacy VOD server 170 as described with respect to FIGS. 1A, 1B, 1C, 1D, 2, 3, and 4.

Various embodiments of the disclosure comprise a live content distribution device, such as the live content distribution device 124a, provided in an MVPD system, such as MVPD system 104a, which may be configured to dynamically generate the one or more VOD content assets, such as 176a, . . . , 176n, for playout. The live content distribution device 124a may comprise, for example, the receiver 126, the segmentation system 128, and the packager 130. The receiver 126 may be configured to receive a live video feed, such as the multiplexed live video feed 156, the plurality of triggers, and the metadata 154 from the broadcast provider system 102 over the network 132. The segmentation system 128 may be configured to determine the plurality of segments 174a, . . . , 174n in the live video feed 172, which corresponds to the multiplexed live video feed 156, based on the received plurality of triggers and the metadata 154. The packager 130 may be configured to dynamically generate the one or more VOD content assets 176a, . . . , 176n based on a package, which includes one or more of the determined plurality of segments 174a, . . . , 174n and the metadata 154 associated with the determined plurality of segments 174a, . . . , 174n, for playout to one or more servers, such as the legacy VOD server 170, communicatively coupled with the MVPD system 104a.

Various embodiments of the disclosure may provide a non-transitory computer-readable medium having stored thereon, computer implemented instruction that when executed by a processor causes a live content distribution device, such as the live content distribution device 124a, provided in an MVPD system, such as MVPD system 104a, to dynamically generate the one or more VOD content assets, such as 176a, . . . , 176n, for playout. A live video feed, such as the multiplexed live video feed 156, the plurality of triggers, and the metadata 154 may be received from the broadcast provider system 102 over the network 132. The plurality of segments 174a, . . . , 174n may be determined in the live video feed 172, which corresponds to the multiplexed live video feed 156, based on the received plurality of triggers and the metadata 154. The one or more VOD content assets 176a, . . . , 176n may be dynamically generated based on a package, which includes one or more of the determined plurality of segments 174a, . . . , 174n and the metadata 154 associated with the determined plurality of segments 174a, . . . , 174n, for playout to one or more servers, such as the legacy VOD server 170, communicatively coupled with the MVPD system 104a.

Thus, the system enables the broadcast provider system and MVPDs to operate more efficiently and optimally providing both a cost and economic advantage. The system delivers VOD In-Program-Restart and Live "C3" VOD live capture for video-on-demand content to its affiliates. The system also supports reception of post "C3" and other content clips over an internet connection. The system provides a unique way to allow broadcast feed to be used to create VOD assets at MVPD systems in real-time with no need for the broadcast provider system to re-encode the content, send it to a third party to redistribute it as a high priority pitch for a high cost. The system eliminates the broadcast provider side encoding/priority pitching of programming data activities and associated costs. Thus, the system facilitates the MVPDs to get the live "C3" content during the critical few hours of primetime which results in an increased viewership. Thus, the system allows legacy VOD systems to play "C3" content immediately after airing while reducing the programmers' distribution costs. The system facilitates the broadcast provider system to pitch post "C3" content directly to the live content distribution system in the MVPD, thereby eliminating the need for a third party pitcher completely.

The word "exemplary" is used herein to mean "serving as an example, instance, or illustration." Any embodiment described herein as "exemplary" is not necessarily to be construed as preferred or advantageous over other embodiments. Likewise, the term "embodiments of the disclosure" does not require that all embodiments of the disclosure include the discussed feature, advantage or mode of operation.

As utilized herein the terms "circuits" and "circuitry" refer to physical electronic components (i.e. hardware) and any software and/or firmware ("code") which may configure the hardware, be executed by the hardware, and/or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer readable storage and/or media, having stored thereon, a machine code and/or a computer program having at least one code section executable by a machine and/or a computer, thereby causing the machine and/or computer to perform the steps as described herein for the dynamic generation of video-on-demand assets for multichannel video programming distributors.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithm, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the present disclosure has been described with reference to certain embodiments, it will be noted understood by, for example, those skilled in the art that various changes and modification could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure not be limited to the particular embodiment disclosed, but that the present disclosure will include all embodiments falling within the scope of the appended claims.

What is claimed is:

1. A system, comprising:
one or more processors in a live content distribution device, wherein the live content distribution device is in a multichannel video program distributor (MVPD) headend of an MVPD system, wherein the one or more processors are configured to:
receive, from a broadcast provider system over a communication network, metadata, a live video feed comprising media items, and a plurality of triggers, wherein the plurality of triggers includes splice points that determine transition points between the media items in the live video feed, and the media items include at least one of a program, a commercial, or a promotional content;
determine a plurality of segments in the received live video feed based on the received plurality of triggers and the received metadata;
determine that a request is received from a user device based on the determined plurality of segments, wherein the request from the user device is associated with at least one video-on-demand (VOD) content asset;
embed at least one audio marker in at least one segment of the plurality of segments based on the request from the user device; and
dynamically generate the at least one VOD content asset based on a package, which includes the at least one segment of the plurality of segments and the metadata associated with the plurality of segments, for playout to one or more servers communicatively coupled with the MVPD system.

2. The system according to claim 1, wherein the live video feed is a broadcast feed received from the broadcast provider system.

3. The system according to claim 1, wherein the received metadata is generated by the broadcast provider system based on first information associated with one of a playout schedule or a specific playout schedule, and second information associated with one of an updated playout schedule or an updated specific playout schedule, and wherein the first information is received from a traffic and scheduler system, and the second information is received from an automation system.

4. The system according to claim 3, wherein the received metadata is generated by the broadcast provider system based on the first information associated with the playout schedule and the second information associated with the updated playout schedule.

5. The system according to claim 1, wherein the metadata is received in-band with the live video feed and the plurality of triggers.

6. The system according to claim 1, wherein the metadata is received out-of-band separate from the live video feed and the plurality of triggers.

7. The system according to claim 1, wherein the one or more servers communicatively coupled with the MVPD system correspond to one or more legacy VOD servers.

8. The system according to claim 1, wherein the metadata includes at least one of digital rights associated with the live video feed, timing information associated with one or more commercial breaks, a program schedule to play one or more advertisements within programming data of the live video feed, or signaling content of the live video feed.

9. The system according to claim 1, wherein the received live video feed is encoded at the broadcast provider system associated with a content provider, and wherein the received live video feed includes at least one of graphical content, closed captions, or specified watermarks.

10. The system according to claim 1, wherein the broadcast provider system determines and updates the metadata in real-time based on information associated with at least one of a playout schedule of programming data and advertisement and promotional content, the programming data and the advertisement and promotional content fetched by an automation system from a content storage in real-time, or titles associated with the programming data, and wherein the broadcast provider system is associated with a content provider.

11. The system according to claim 1, wherein the one or more processors are further configured to transcode the plurality of segments at the MVPD headend based on the request from the user device.

12. The system according to claim 1, wherein
the broadcast provider system generates a new channel based on first information associated with a specific playout schedule,
the first information corresponds to at least one of insertion of a discontinuity between the media items or insertion of promotional content items specific to the broadcast provider system between the media items,
the specific playout schedule comprises second information that indicates a time at which the broadcast provider system transmits the new channel to the MVPD system, and
the one or more processors are further configured to receive the new channel at the time indicated by the second information.

13. The system according to claim 1, wherein the one or more servers communicatively coupled with the MVPD system corresponds to at least one of a legacy VOD server or an active video server, and wherein the one or more processors are further configured to:
playout the at least one VOD content asset to the legacy VOD server based on the determination that the request is received; and
playout the plurality of segments to the active video server based on a determination that the request is not received.

14. A method, comprising:
in a live content distribution device that is in a multi-channel video program distributor (MVPD) headend of an MVPD system:
receiving, from a broadcast provider system over a communication network, metadata, a live video feed comprising media items, and a plurality of triggers, wherein the plurality of triggers includes splice points that determine transition points between the media items in the live video feed, and the media items include at least one of a program, a commercial, or a promotional content;
determining a plurality of segments in the received live video feed based on the received plurality of triggers and the received metadata;
determining that a request is received from a user device based on the determined plurality of segments, wherein the request from the user device is associated with at least one video-on-demand (VOD) content asset;
embedding at least one audio marker in at least one segment of the plurality of segments based on the request from the user device; and
dynamically generating the at least one VOD content asset based on a package, which includes the at least one segment of the plurality of segments and the metadata associated with the plurality of segments, for playout to one or more servers communicatively coupled with the MVPD system.

15. The method according to claim 14, wherein the live video feed is a broadcast feed received from the broadcast provider system.

16. The method to claim 14, wherein the received metadata is generated by the broadcast provider system based on first information received from a traffic and scheduler system, and second information received from an automation system.

17. The method according to claim 14, wherein the metadata is received in-band with the live video feed and the plurality of triggers.

18. The method according to claim 14, wherein the metadata is received out-of-band separate from the live video feed and the plurality of triggers.

19. The method according to claim 14, wherein the one or more servers communicatively coupled with the MVPD system correspond to one or more legacy VOD servers.

20. The method according to claim 14, wherein the metadata includes at least one of digital rights associated with the live video feed, timing information associated with one or more commercial breaks, a program schedule for playing one or more advertisements within one or more segments of programming data of the live video feed, or signaling content of the live video feed.

21. The method according to claim 14, wherein the received live video feed is encoded at the broadcast provider system associated with a content provider, and wherein the received live video feed includes at least one of graphical content, closed captions, or specified watermarks.

22. The method according to claim 14, wherein the broadcast provider system determines and updates the metadata in real-time based on information associated with at least one of a playout schedule of programming data and advertisement and promotional content, the programming data and the advertisement and promotional content fetched by an automation system from a content storage in real-time, or titles associated with the programming data, and wherein the broadcast provider system is associated with a content provider.

23. The method according to claim 14, further comprising transcoding the plurality of segments.

24. A non-transitory computer-readable medium having stored thereon, computer-executable instructions that when executed by a processor in a computer, cause the computer to execute operations, the operations comprising:

in a live content distribution device that is in a multi-channel video program distributor (MVPD) headend of an MVPD system:
  receiving, from a broadcast provider system over a communication network, metadata, a live video feed comprising media items, and a plurality of triggers, wherein the plurality of triggers includes splice points that determine transition points between the media items in the live video feed, and the media items include at least one of a program, a commercial, or a promotional content;
  determining a plurality of segments in the received live video feed based on the received plurality of triggers and the received metadata;
  determining that a request is received from a user device based on the determined plurality of segments, wherein the request from the user device is associated with at least one video-on-demand (VOD) content asset;
  embedding at least one audio marker in at least one segment of the plurality of segments based on the request from the user device; and
  dynamically generating the at least one VOD content asset based on a package, which includes the at least one segment of the plurality of segments and the metadata associated with the plurality of segments, for playout to one or more servers communicatively coupled with the MVPD system.

* * * * *